United States Patent [19]

Finkel et al.

[11] Patent Number: 5,466,476
[45] Date of Patent: Nov. 14, 1995

[54] PASTRY CRUST AND PASTRY CRUST DOUGH

[75] Inventors: Gilbert Finkel, Morristown, N.J.; Katherine L. Moore, Cincinnati, Ohio

[73] Assignee: The Procter & Gamble Company, Cincinnati, Ohio

[21] Appl. No.: 754,149

[22] Filed: Sep. 3, 1991

Related U.S. Application Data

[63] Continuation of Ser. No. 495,872, Mar. 19, 1990, abandoned.

[51] Int. Cl.$^6$ .............................. A21D 8/00; A21D 13/08
[52] U.S. Cl. ...................... 426/556; 426/601; 426/610
[58] Field of Search ...................... 426/556, 601, 426/610

[56] References Cited

U.S. PATENT DOCUMENTS

| | | | |
|---|---|---|---|
| 2,611,704 | 9/1952 | Jaeger | 99/94 |
| 3,151,987 | 10/1964 | Colby | 99/92 |
| 3,294,547 | 12/1966 | Kooistra | 99/92 |
| 3,615,682 | 10/1971 | La Baw | 426/556 |
| 3,676,151 | 7/1972 | Scharschmidt | 99/86 |
| 3,692,535 | 9/1972 | Norsby et al. | 99/92 |
| 3,769,034 | 10/1973 | Drier, Jr. et al. | 426/151 |
| 4,297,378 | 10/1981 | Haasl et al. | 426/532 |
| 4,372,982 | 2/1983 | Haasl et al. | 426/549 |
| 4,374,151 | 2/1983 | Lindstrom et al. | 426/19 |
| 4,399,157 | 8/1983 | Caporaso | 426/108 |
| 4,456,625 | 6/1984 | Durst | 426/106 |
| 4,511,585 | 4/1985 | Durst | 426/106 |
| 4,622,226 | 11/1986 | Ke et al. | 426/94 |
| 4,647,467 | 3/1987 | Pinto | 426/502 |
| 4,812,318 | 3/1989 | Finkel | 426/94 |
| 4,904,493 | 2/1990 | Petrizzelli | 426/556 |
| 4,980,193 | 12/1990 | Finkel | 426/631 |
| 5,246,727 | 9/1993 | Finkel | 426/601 |

FOREIGN PATENT DOCUMENTS

| | | |
|---|---|---|
| 85557 | 8/1983 | European Pat. Off. . |
| 2602398 | 12/1988 | France . |
| 58-009641 | of 1983 | Japan . |
| 63-222642 | 9/1988 | Japan . |
| 63-240742 | 10/1988 | Japan . |

OTHER PUBLICATIONS

I. S. Rombauer and M. R. Becker, "Joy of Cooking", pp. 638–641, 643–649, 615–616 (1975).
L. Bisno, "Some Considerations in Commercial Pie-Baking", Bakers Digest, 1950 Part One, 21–23, 27 (Feb.; Part Two, 31–34 (Apr.); Part Three, 21–22, 33 (Jun., 1950).
Sun, et al—Effects of Polyols on the Functional Properties of Flour-filmed Food—Journal of Chinese Agricultural Chemical Society (abstract).

*Primary Examiner*—Jeanette Hunter
*Assistant Examiner*—Mary S. Mims
*Attorney, Agent, or Firm*—Rose Ann Dabek; G. W. Allen; J. C. Rasser

[57] ABSTRACT

This invention relates to a process for making a pastry dough, and in particular for making a pie crust dough. The process involves making two phases, a dough like mixture of flour, water, salt and oil, and a shortening, starch and polyol phase. These phases are laminated to make a heterogeneous pastry dough which has a flaky tender texture when baked. This dough composition is made in manner which is largely independent of processing temperatures and mix times. The dough is characterized by having multiple, discontinuous layers which are interrupted by regions of gluten and the starch/fat/polyol phase.

23 Claims, No Drawings

PASTRY CRUST AND PASTRY CRUST DOUGH

This is a continuation of application Ser. No. 07/495,872, filed on Mar. 19, 1990 now abandoned.

FIELD OF THE INVENTION

This invention relates to a process for making a pastry dough, and in particular for making a pie crust dough. The process involves making two phases, a dough like mixture of flour, water, salt and oil and a shortening, starch and polyol phase. These phases are laminated to make a pastry dough.

BACKGROUND OF THE INVENTION

Frozen, refrigerated and shelf stable pie crusts and pastry doughs have been commercially available for a number of years. These products offer the consumer convenience in making a product. There are a number of formulations which are used to make the product flaky, tender, not too brown, easy to handle or shelf stable. However, each of these formulations has special requirements for mixing, processing, handling and storage.

Polyols, such as glycerine, have been added to pastry products for a number of reasons. These include: preventing the loss of water; lowering the water activity and thus increasing the bacterial stability of the product; depressing the freezing point of doughs; strengthening the dough and otherwise improving its handling characteristics.

Japanese patent 63-240,742 (1988) discloses a pie crust manufactured with polyols. The dough contains flour, both a "strong" and a "weak" flour, emulsified fat, water, glycerine and an additional "roll-in" or margarine fat. The dough is put together by a rolling and kneading process.

U.S. Pat. No. 3,692,535 issued to Norsby, et al., (1972) discloses a ready to bake pie crust which is shelf stable. The dough contains shortening, flour and water. A second dough of developed wheat gluten is prepared from wheat flour, water and 0% to 30% shortening. Glycerine can be added at a level of 7% to 10% in the flour and water dough. U.S. Pat. No. 3,769,034 issued to Dreier, et al., (1973) discloses a dough composition having a dough moisture level of 18% to 26% and which is shelf stable for prolonged period of times. The dough contains flour, gelatinized and ungelatinized starches, shortening, water and a mold or yeast inhibitor. These doughs are stable under non-refrigerated storage conditions. From 0% to 3% of the plasticizer, propylene or glycerine can be added.

U.S. Pat. No. 2,611,704 issued to Jaeger (1952), discloses dry mixed products for making various baked goods. Examples 13 to 15 are for dry pie crust mixes. In Example 15 the shortening contains glycerol monopalmitate as a stabilizer, lard, locust bean gum, and glycerine as a humectant. The products containing glycerine are said to have less shrinkage than the products made without the glycerine.

U.S. Pat. No. 3,294,547 to Kooistra (1966), discloses a low moisture dough system for making pies which contains 40% to 55% flour, 10% to 25% water, 20% to 35% shortening and 1% to 15% glycerine. The ratio of glycerol to water ranges from 1:9 to 3:2. These products are said to have a stronger dough sheeting process.

U.S. Pat. No. 3,676,151 to Scharschmidt (1972) discloses a toaster pastry. The dough for the toaster pastry contains 9% to 25% fat, 4% to 16% sucrose, 45% to 60% flour and a moisture content of 10% to 25%. In a preferred embodiment the dough contains 1% to 10% of a humectant (glycerine), leavening, non-fat milk solids, yeast and salt.

U.S. Pat. No. 4,374,151 issued to Lindstrom, et al. (1983) discloses a frozen, leavened dough suitable for making baked products which thaws faster due to the presence of 5% to 20% of a melting point depressant. Glycerine is used as a melting point depressant.

U.S. Pat. No. 4,399,157 issued to Caporaso (1983) discloses a package system for fully baked unfilled pastry shells. This application suggests that the unfilled pastry shells have a moisture level of 4%, a substantially continuous surface, and from 2% to 5% glycerine which improves the physical strength of the product and maintains the flaky texture of the shell over extended periods of storage.

U.S. Pat. No. 4,456,625 issued to Durst (1984) discloses ready-to-eat pie crust which contains non-gelatinized starch and which are shelf stable for up to one year. The baked goods are prepared from a flour containing base batter mix, water and at least 5% by-weight of an edible polyhydric alcohol.

U.S. Pat. No. 4,511,585 issued to Durst (1985) is a related application. This patent claims the baked goods of the '625 patent. Both of these patents are primarily directed toward batter based products and bread, not pie doughs.

U.S. Pat. No. 4,622,226 issued to Ke, et al. (1986) discloses ready-to-eat puff pastries that are produced by baking a multi-layered laminate comprising alternate layers of a dough and a roll-in shortening, wherein the flour of the dough is partially substituted with dextrin.

European Patent Application 85,557 issued to Warren, et al. (1983} discloses a fully baked shelf stable pastry shell having a moisture content of less than 4% and comprising on a dry weight basis 50% to 85% flour, 10% to 45% fat, glycerine in an amount up to 5% (which is effective to maintain the texture for extended storage of up to 6 months). This pie crust is made by creaming the shortening, blending the fat and flour for 6 minutes. Separately water, salt, coloring and glycerine are mixed and then blended with the flour and batter until a uniform wetted dough is prepared.

U.S. Pat. No. 3,151,987 issued to Colby (1964) describes a process for making a pastry dough in which a dough is prepared from flour and water. The flour is mixed with the water only until the water is absorbed and the flour has been wetted without significant gluten development. This flour water mixture is layered with a plastic shortening having a consistency of paste. Spry or Primex are recommended. Layers of the flour paste and shortening are alternated and then compressed to the desired thickness before baking.

French patent 2,602,398 issued to Petrizelli (1988) describes a storage stable preservative free pastry dough. The pastry dough contains inactivated cereal flour, starch, sugar, fat and glycerine as well as an emulsifier. The preferred emulsifier is lecithin or a mixture of fatty acid mono- and di-glycerides with lecithin. The inactivated flour has an alpha amylase activity of 0 and very reduced lipase and peroxidase activity. The starch is preferably a corn starch. This dough is used to make tarts or biscuits.

"The Effects of Polyols on the Functional Properties of Flour-filmed Food," Sun, et al., Journal of Chinese Agricultural Chemical Society, 17, 158–166 (1979), describes the effect of a polyol, in particular glycerine, on the rheological properties of flour filmed foods. The polyol/flour/water mixtures had better rheological properties and palatability.

Japanese patent 63–322,642 (1988) describes a rolled pie dough by mixing emulsified fat, water and flour. The emulsified fat contains glycerine.

U.S. Pat No. 4,812,318 issued to Finkel (1989) discloses the use of liquid polyols in a butter and flour mixture which has an increased viscosity. This mixture is used in croissants and other pastry products as a replacement for shortening. The butter is said to remain in the dough during processing (it doesn't separate).

Sheeting of doughs and folding or laminating of two doughs is al so known.

U.S. Pat. No. 4,647,467 issued to Pinto (1987) discloses an apparatus for making a flat sheet comprising a layer of fat sandwiched between two layers of dough. The sheet is produced by a co-extrusion die with a slot-like orifice. This material can be laminated, rolled and cut to form multi-layered bakery products.

Japanese 63–240742 (1988) states that a folding step for the dough followed by baking produces a pie with "light and voluminous texture".

U.S. Pat. No. 4,297,378 issued to Haasl, et al., (1981) describes a dough composition for making quality "thinly sheeted" pie crust which is shelf stable. The dough contains a high starch, low enzyme flour, shortening, gluten and preservatives. The dough is manufactured, pre-sheeted, folded twice before packaging.

U.S. Pat. No. 4,372,982 issued to Haasl, et al., (1983) is related to the '378 patent. This application claims the use of a vacuum treatment of the dough. The high starch, low enzyme flour mixture is said to prevent browning reactions during storage.

All of these processes have been used to solve one or more problems. However, it has now been found that a pastry dough which is stable on refrigerated or frozen storage can be made by layering two different phases, one containing flour, water, salt and shortening, the conventional pastry or pie crust ingredients, and a second phase which uses starch, polyol (glycerine}, oil and/or shortening. The layering of these phases to make a heterogeneous dough produces a low fat, flaky pie crust on baking. The phases can also be layered in a manner which is more continuous or homogeneous, thus making a low fat pastry, e.g. puff pastry or croissant product. Both of these doughs contain less fat than current commercial products. In addition, the doughs are not sensitive to mixing time and temperature which is a common complaint of the pie dough maker. Overworking of the dough in conventional pie crust making can cause it to be tough. If the shortening or lard is not kept cold and crystalline in conventional pie crust making, then the final product is not flaky. These problems are overcome by this invention.

Therefore, it is an object of this invention to make a pie crust or pastry dough which has an increased flakiness, good workability at cold temperatures and fast thaw times. This product is made by a process which is not dependent on the mixing time, work input and mixing temperature conditions commonly used in making these types of doughs.

It is a further object of this invention to make a pastry dough which is low in fat and also low in saturated fats.

These and other objects will be evident from the description herein.

All percentages are by weight unless otherwise indicated.

SUMMARY OF THE INVENTION

A process for making a pie crust dough comprising:
(a) preparing a first phase comprising:
  (1) from about 20% to about 45% shortening;
  (2) from about 55% to about 80% ungelatinized starch;
  (3) from about 0.8% to about 5.0% polyol; and
(b) preparing a second phase comprising:
  (1) mixing from about 20% to about 80% flour with from about 10% to about 30% water and 0.5 to about 2% salt; said flour having a protein content of from about 3% to about 14%;
  (2) adding from about 10% to about 30% oil and/or shortening to make a cohesive dough;
  (3) holding said dough for at least one hour;
(c) sheeting said second phase dough;
(d) applying said first phase to the surface of the sheeted second phase, the combined phases comprising from about 10% to about 35% first phase and from about 65% to about 90% second phase. The layers are then folded to make a laminated or layered product which is characterized by having discrete regions containing the shortening composition of the first phase and discrete regions of the second phase which contain developed gluten. This pastry or pie crust dough makes a flaky, tender crumb when baked; yet is easy to handle at cold temperatures and is low in fat.

DETAILED DESCRIPTION OF THE INVENTION

As used herein, the term "pie dough" or "pastry dough" means a stiff mixture of flour, shortening or oil, a polyol and water along with other additives which is used to make a pie or tart or similar baked crust, croissant or puff pastry.

As used herein, the term "phase" relates to mixtures of shortening, flour or starch and a liquid (oil or water). The phases are not necessarily doughs or doughlike.

As used herein, the term "flour" means a material obtained by comminuting or grinding a cereal grain or edible seed. Flour is a mixture of starch and protein, usually gluten-forming proteins, e.g. glutenin and gliadin mixtures. Artificial flours which are mixtures of starches and proteins can also be used herein. Typical flours include wheat flour, barley flour, rye flour, oat flour and corn flour. Mixtures of starches and proteins can also be used. The flours can be bleached or unbleached, enriched, steamed or heat treated. Generally the flour will contain from about 3% to 14% protein and 14% or less moisture. Peanut and other nut flours can also be used. However, these flours are preferably used with other flours since they generally have distinctive flavors and would be better used as subtle flavorants. The flours can also contain fiber or non-digestible polysaccharides. Psyllium and cellulose can be mixed with the flour or starch.

As used herein, the term "starch" refers to a polycarbohydrate or polysaccharide, usually a polyglucose in the form of amylose and amylopectin. Both types of starches will function herein. Starch is primarily obtained from cereal grains. Common starches include those derived from potato, wheat, corn, rice, maize, barley, rye and tapioca. Substantially ungelatinized starches are preferred for use herein.

As used herein, the term "shortening" or "oil" includes synthetic and natural triglycerides and other oil substitutes such as polyol polyesters of fatty acids and alcohols as well as polyesters of polycarboxylic acids. Oils generally have a melting point below 20 C., and thus are liquid at room temperature. Shortenings usually contain some solid fats, those having a melting point above 20 C., along with an oil.

Solid fats which can be utilized in compositions of the present invention include triglycerides having C12 to C22 hydrocarbon chains with three fatty acid moieties. These materials can be derived from plants or animals or can be edible synthetic fats or oils. For example, animal fats such as lard, tallow, oleo oil, oleo stock, oleo stearin and like, which are solid at room temperature can be utilized. Also, liquid oils, e.g., unsaturated vegetable oils, can be converted into plastic fats by partial hydrogenation of the unsaturated double bonds of the fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil.

Also suitable for use herein as the shortening or oil component are the so-called low molecular weight synthetic fats which are certain tri- or diglycerides in which one or two of the hydroxyl groups of the glycerine have been esterified with acetic, propionic, butyric or caprionic acids and one or two of the remaining hydroxyl groups of the glycerine have been esterified with higher molecular weight fatty acids having from 12 to 22 carbon atoms.

Other common types of fat include: cocoa butter and cocoa butter substitutes, such as shea and illipe butter; milk fats, such as butter fat; and marine oils which can be converted into plastic or solid fats such as menhaden, pilcherd, sardine, whale and herring oils.

Many classes of reduced calorie fat, fat-like substances, or mixtures thereof, are suitable for use in the present compositions, to make up part of the composition (from 10% to 90%). Examples of such materials are: fatty alcohol esters of polycarboxylic acids (U.S. Pat. No. 4,508,746 to Hamm, Apr. 2, 1985); fatty alcohol diesters of dicarboxylic acids such as malonic and succinic acid (U.S. Pat. No. 4,582,927 of Fulcher, issued Apr. 15, 1986); triglyceride esters of alpha branched chain-alkyl carboxylic acids (U.S. Pat. No. 3,579,548 of Whyte, issued May 18, 1971); fatty acid diglyceride, diesters of dibasic acids (U.S. Pat. No. 2,874,175 to Feuge et al.); and alpha-acylated glycerides (U.S. Pat. No. 4,582,715 to Volpenheim). Also suitable for use as a fat substitute in the present invention are medium chain triglycerides, highly esterified polyglycerol esters, polyoxyethylene esters and jojoba esters.

Synthetic solid fats which have been specifically tailored to provide calorie reduction benefits relative to conventional fats can be used. Of these, especially preferred are reduced calorie fats comprising at least about 15% by weight triglycerides selected from the group consisting of MML, MLM, LLM, and LML triglycerides, and mixtures thereof; wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof.

Other preferred fat-like materials include solid sucrose polyesters. Solid sucrose, polyesters, and processes for making them, are described in U.S. Pat. No. 4,005,195, Jandacek, issued Jan. 25, 1977, U.S. Pat. No. 3,600,186, Mattson et al., issued Aug. 17, 1971, U.S. Pat. No. 3,963,699, Rizzi et al., issued Jun. 15, 1976, U.S. Pat. No. 4,518,772, Volpenheim, issued May 21, 1985, and U.S. Pat. No. 4,517,360, Volpenheim, issued May 14, 1985.

Sucrose polyesters are fat-like polymers comprising sucrose fatty acid ester compounds that contain four or more fatty acid ester groups are substantially non-digestible and consequently non-absorbable by the human body. It is not necessary that all of the hydroxyl groups of the sucrose be esterified with fatty acid, but it is preferable that the sucrose contain no more than three unesterified hydroxyl groups, and more preferable that it contain no more than two unesterified hydroxyl groups. Most preferably, substantially all of the hydroxyl groups of the sucrose are esterified with fatty acid, i.e., the compound is substantially completely esterified. The fatty acids esterified to the sucrose molecule can be the same or mixed.

The fatty acids groups esterified to the sucrose molecule must contain from about 8 to about 22 carbon atoms, and preferably from about 14 to about 18 carbon atoms.

As used herein, the term "polyol" means an organic compound which has at least two hydroxyl groups, for example, a glycol, glycerine, or a sugar alcohol.

As used herein, the term "sheet" means a thin flat piece of dough, i.e. a piece of dough which has been rolled to make a sheet of dough.

As used herein, the term "laminated" means that the sheet of dough (the second phase) forms one layer and the first phase which is a starch, glycerine and shortening phase forms a second layer which is on top of or superposed on the second phase sheet. Laminates include a configuration in which there is a second phase sheet, first phase and then another second phase sheet on top. In other words, a sheet, a second phase layer and then a sheet. Each of these phases comprises a "layer" as the term it used herein. Thus this configuration is three layers.

A. Preparation of First Phase Mixture

This phase provides either a continuous or a non-continuous layer in the final pie crust or pastry dough product. The final dough product containing non-continuous layers appears macroscopically homogeneous, however, it is really a multi-layered product with pockets of first phase fat dispersed throughout it. These pockets or discrete regions provide discontinuity to the product. This discontinuity is important for making a flaky pie crust. When the fat phase is continuous, i.e. it covers the entire second phase dough, the product appears layered and uniform.

The first phase is a mixture of starch, glycerine and a solid shortening. From about 55% to about 80% starch is mixed with from about 0.8% to about 5.0% polyol and from about 20% to about 45% shortening.

The starch is derived from cereal grains. Corn starch, rye starch, potato starch and wheat starch are commonly used. Because of the water holding capacity of pregelatinized starches and because of how this water holding capacity affects the finished product, it is necessary to limit the amount of pregelatinized starches to less than 10% of the starch ingredient. Preferably, the level of pregelatinized starch in the starch ingredient is from 0% to about 5%. Preferably the phase one composition will contain from about 60% to about 75% starch.

The starch addition to this first phase shortening dilutes the shortening. This enables the level of shortening used in the final product to be lower. A lower fat pastry dough can then be made.

From about 0.8% to about 5% edible polyol is used in first phase composition; preferably from about 1% to about 3.5% are used. Glycerine and propylene glycol are the preferred polyols. However, other sugar alcohols such as mannitol and sorbitol can be used. Mixtures of glycerine and sugar alcohols can also be used. The polyol can be added to the shortening and then mixed with the starch or all three ingredients can be added simultaneously.

Preferred shortening compositions include hydrogenated and unhydrogenated animal or vegetable oils. Shortenings usually contain from about 1% to about 15% hardstock. Hardstock are triglycerides of long chain saturated fatty acids which have an Iodine Value of 15 or less. Tristearin, tripalmitan and mixed triglycerides of palmitic and stearic acid are preferred hardstocks for use in shortenings. Other fatty acids can be present, usually the hardstock is made of fatty acids having from 12–22 carbon atoms. The triglyceride hardstock comprises from about 75% to about 100% by weight of beta tending triglyceride and from 0% to about 25% by weight of non-beta tending triglyceride. Preferably, the triglyceride hardstock is all beta tending triglyceride.

Suitable normally solid triglycerides having strong beta-forming tendencies include, for example, substantially completely hydrogenated triglyceride fats derived from soybean oil, hazelnut oil, lard, linseed oil, olive oil, peanut oil and sunflower seed oil. Substantially completely hydrogenated soybean oil, for example, soybean oil hydrogenated to an iodine value of less than about 10, is a suitable beta-tending triglyceride constituent. Preferably these solid fats are made from long chain fatty acids.

In conventional pie crust making, the crystals of hardstock are kept solid. This gives discrete shortening pockets or regions in the pie crust. While not wishing to be bound by theory, it is believed that in this invention the flakiness is not caused by the hardstock crystals, but rather by the random dispersion of phase one throughout the pie crust dough. The flakiness of the crust is achieved by the behavior of the phase one particles which end up in discrete regions or pockets throughout the product and provide discontinuity. These trapped particles of phase one remain intact even though the product is worked in the folding or multiple lamination step. When a less flaky, more layered dough is desired the phase one product is evenly distributed on the second phase. This provides a puff pastry or croissant.

Another important factor in providing the discontinuity of the crust is believed to be the discrete pockets or regions of gluten formed in the phase two dough.

The mixing temperatures and times are not as critical for forming this first phase as they are in conventional pastry processing technology. Mixing between 60° F. (15° C.) and about 80° F. (27° C.) is acceptable. It is not necessary to mix this phase at refrigerator temperatures or to be sure that the shortening is chilled before mixing.

The three ingredients are mixed together in a conventional mixer to form a dry composition which is a mixture of discrete particles of random size and shape. In general, the particles 15 should not exceed one inch (2.5 cm) in diameter. The minimum size is not as critical, but the majority of the particles should be about one-eighth to one-quarter of an inch (0.3 cm to 0.6 cm).

Mixing times of 30 seconds to 90 seconds are sufficient. A standard mixer with a whisk blade is used. Preferably, a Hobart M-50 model mixer is used. It is critical that the phase one product be in the form of non-uniform particles. When the mixing is carried out so that the product is homogeneous, the cohesive mass will not form the discrete phase one portions in the finished product.

B. Preparation of Second Phase

The second phase provides the structure and the strength to the finished pie crust or pastry dough. This phase is similar in composition to a pie dough, but it is prepared in a different manner. The shortening level is lower than conventional crusts, it can contain liquid oils, and the flour is mixed with water and salt to develop a gluten structure. The development of gluten is not ordinarily recommended in conventional pie crust since it tends to make the product tough.

The second phase is formed in three steps. First from about 20% to about 80% flour is mixed with from about 10% to about 30% water and 0.5% to about 2% salt. The water in the flour is not included in the water levels. The flour should have a protein content of from 3% to about 14%. The protein must be capable of forming a developed gluten structure (or a product with similar elastic, flowable dough properties). Examples of such proteins are glutenin and gliadin found in hard wheat flours. Other proteins which contain similar sufhydryl containing amino acids can be used.

This is a very low water system and the flour and water mixture forms hard pellets of irregular shapes. These pellets contain gluten which is highly developed. The developed gluten provides a strength and flexibility to the finished dough which is not present when the gluten is absent. Gluten is a mixture of water (65%–75%) solids comprising 75%–80% protein, primarily gliadin and glutenin, 5%–15% starch, and 5%–10% lipids, and small quantities of mineral salts. The protein, lipids, starch and salts are present in flours derived from wheat (both hard and soft wheats).

The mixing time and temperature is not critical. Any conventional mixer can be used. A Hobart or other paddle mixer, extruders, twin screw mixers, such as a Readco, are also useful. The mixing is usually done for about 1 to 3 minutes. It is important not to mix the flour and water until the mixture becomes uniform. The mixing is done only until the flour has absorbed the water and made the irregularly shaped pellets.

Salt is added with the flour. The phase two composition contains from about 0.5% to about 2% salt. Salts include sodium chloride, potassium chloride, mixtures of sodium and potassium chlorides and monosodium glutamate. Preferably the salt is sodium chloride.

Other flavorants can also be used, these include artificial or natural flavors. Preferred flavorants for adding to a pastry or pie crust are butter flavors, lard or tallow flavors, and herbal flavors such as dill, rosemary, sage or thyme. Sesame seed and nuts can also be added. Pecans and walnuts are preferred for their flavor. Generally the level of these flavorants is determined by taste. A level of from about 0.1% to about 2% is acceptable.

Other additives include coloring agents, leavening to adjust the pH of the dough and browning aids. Browning aids include non-fat milk solids, reducing sugars, e.g. fructose, dextrose and mixtures of these sugars, and amino acids. Sugars can also be added to adjust the sweetness of the product. Sugars includes sucrose, honey, fructose, dextrose and sugar alcohols. Artificial sweeteners such as aspartame, saccharin, acesulfam, and related products can also be included.

The flavorants are usually added to the flour before mixing with the water because they are dry materials. Liquid flavorants could be added to the water and then mixed with the flour. Emulsifiers such as mono- and diglycerides of long chain fatty acids, lecithin, and sucrose mono- and diesters can be used to disperse the flavors and other additives in the water.

Antioxidants, such as butylhydroxytoluene (BHT) and butylhydroxyanisole (BHA), can also be added to the dough or to the shortening or oil. These materials protect the flavor from degrading and the shortening or oil from becoming rancid. Mold and yeast inhibitors can also be added to improve the storage stability of the doughs and of the final product.

Preferably for this phase the shortening component is a low melting oil. The shortening can contain very little hardstock, preferably, less than 5%, and most preferably, from 0.2% to about 2%. Highly unsaturated oils such as sunflower seed oil, canola, safflower oil and cottonseed oil are preferred. The low melting oil contributes to the faster thaw times for the frozen pastry dough.

The shortening component is mixed with the flour and water "pellets" until a cohesive dough is formed. This dough will look like bread dough. Any conventional dough mixing device may be used to incorporate the shortening in with the flour and water. The dough has an apparent uniformity to it. The time and temperature necessary to reach this macroscopic uniformity is not critical. The mixing step further develops the gluten which is believed to be important in the final product. Generally mixing times of from about 30 seconds to 4 minutes are used, preferably the mixing time will be from 1 to 2 minutes. Mixing temperatures of from about 55° F. (12° C.) to about 85° F. (30° C.) are used.

Hold Time

After the cohesive dough is formed, the dough is held at ambient temperature for at least one hour, and preferably for about two to three hours. The dough can be held for longer periods, such as overnight, but since it is not microbially stable, care must be taken to insure that it is not held too long.

While not wishing to be bound by theory, it is believed that during this holding time relaxation of some of the developed gluten occurs. This results in a flexible strong dough. The dough which is not held is not as strong and tears on handling.

Sheeting Process

After the dough has been held for one to three hours, the dough is sheeted to about 0.5 cm to 2 cm thick. Sheeting of dough is conventional and can be accomplished using a pastry sheeter or extruder with a rectangular or similar shaped opening.

The first phase mixture of starch, polyol and shortening are distributed over the sheet of dough. The first phase is sprinkled on the surface of the sheet.

The final product contains from about 10% to about 35% of first phase and from about 65% to 90% second phase. Preferably from about 15% to about 25% first phase is used and from about 75% to about 85% second phase is used.

Folding or Laminating Process

The sheet is then folded over the first phase to envelop the first phase. The first phase mixture is essentially sandwiched between two sheets or laminated. This folded dough is then rolled to a thickness of from about 0.5 cm to about 2 cm. The dough is then folded again and rerolled to the same thickness. This folding and rolling is continued until the dough has at least 20 layers and preferably from about 20 to about 50 layers, and most preferably from about 25 to 40 layers are formed. The number of steps to reach this is not large since the number layers multiply by two each time it is folded. For example, starting with a three layer system, four folds gives 48 layers.

This type of folding or laminating is common in the pastry industry and is used for making croissant doughs, puff pastry doughs and similar pastry formulations.

Rykaart, Inc. provides machinery to accomplish this purpose. Similar devices are available from Rademaker, Rheon or Moline companies.

The final pastry product has a thickness of from about 0.25 cm to about 0.5 cm (3/32 inches to about 1/5 inches). It is important in the final product that the layers have some discontinuity when making a pie crust or flaky pastry. This discontinuity is due to the presence of discrete portion of the fat particles of phase one and discrete regions of developed gluten. Without this discontinuity, the product would not be flaky, but would rather resemble a croissant of other pastry product. It would be a layered pastry, rather than a pie crust which is characterized by its ability to break into flakes and not whole layers.

The product is then cut and packaged or stored. Conventional cutting methods can be used. An advantage of this product is that the scraps from the cutting can be added to the phase two dough at levels of up to about 20% without affecting the properties of the final product.

Packaging and Storage

The final dough sheet is ready for storing or baking. Preferably, the dough is refrigerated at 0° C. or less. The dough should be packaged in materials appropriate to the storage. Preferably, the package will be impervious to water and oxygen. Oxygen will oxidize the fat in the dough and water will also lead to rancidity in the dough and help support bacterial growth. Water loss will also occur if the package allows water to pass from the product to the atmosphere. This will result in a too dry product.

The final product has a fat content in the range of 20% to about 40% by weight. Preferably, the fat level will be from about 20% to about 30% by weight. This is considerably lower than most commercial products and home recipes which have fat levels in the range of 30% to 40% by weight. Moreover, because of the low level of hardstock used in the phase two dough, the product is lower in saturated fats.

The following example illustrates this invention, but is not limiting thereof.

Example I

Preparation of phase one:

| Ingredients | Amounts (% by weight) |
| --- | --- |
| Crisco* | 31.7 |
| Wheat Starch | 63.5 |
| Glycerine | 2.0 |
| Nonfat milk solids | 2.8 |

*Crisco is a vegetable oil shortening containing hardstock and partially hydrogenated soybean oil.

The starch and the nonfat milk solids are mixed together at low speed for about 30 seconds in a Hobart Mixer fitted with a whisk paddle. The shortening and the glycerine are mixed together and then added to the starch. This is mixed for seventy-five (75) seconds at medium speed. Small particles are formed. Any large lumps are broken up. All mixing operations are conducted at ambient temperatures (about 25 C.).

Preparation of phase two:

| Ingredients | Amounts (% by weight) |
| --- | --- |
| Crisco* | 6.3 |
| Wheat Starch | 10.0 |
| Wheat Flour (12% protein) | 49.0 |
| Salt | 0.9 |
| Water | 18.9 |
| Safflower Oil | 14.9 |

*Crisco is a vegetable oil shortening containing hardstock and partially hydrogenated soybean oil.

The flour, starch and salt are mixed for one minute at low speed in a Hobart Mixer fitted with a harp paddle blade. The water is added and the combination is mixed for 45 seconds at medium speed. The shortening and oil are added and the composition is mixed for 1 minute and 45 seconds at medium speed. This composition is then held for one hour at ambient temperature.

This mixture is then sheeted in a pastry sheeter to a thickness of 2 cm. The first phase product is then spread on top of this sheet (25 gm for each 75 gm of dough sheet is used). The first phase product varies in size, but it is spread fairly uniformly across the sheet. The sheet is then folded, rerolled to a thickness of 1 cm and then folded again. This is continued for 6 more times. The final folded sheet is rolled to a thickness of 3/32 of an inch (0.23 cm). All mixing and sheeting operations are conducted at ambient temperatures.

Examination of the sheet shows a layered product which has some discontinuity. Discrete regions of phase one fat composition and of developed gluten from phase two are evident in the dough on close inspection.

This product is cut into squares and frozen.

The product thaws within 15 minutes, is strong and easy to handle. When baked, the product is golden brown and flaky and tender in texture.

The final fat content of the product is 25%.

What is claimed is:

1. A process for making a pie crust having from about 20% to about 30% fat comprising:
   a) preparing a first phase comprising;
      1) from about 20% to about 45% shortening;
      2) from about 55% to about 80% ungelatinized starch;
      3) from about 0.8% to about 5% polyol; and
   b) preparing a second phase comprising;
      1) mixing from about 20% to about 80% flour with from about 10% to about 30% water and 0.5% to about 2% salt; said flour having from about 3% to about 14% protein; and
      2) adding from about 15% to about 30% oil and/or shortening to make a cohesive dough;
      3) holding said dough for at least one hour;
   c) sheeting said second phase dough;
   d) applying said first phase to the surface of the sheeted second phase and folding the combined phases to make a laminated product, said product comprising from about 10% to about 35% first phase and from about 65% to about 90% second phase, the first phase being present in discrete regions.

2. A process according to claim 1 wherein said polyol is selected from the group consisting of propylene glycol, glycerine, sorbitol and mannitol and mixtures thereof and wherein said protein is a mixture of gliadin and glutenin.

3. A process according to claim 2 wherein said starch is selected from the group of corn starch, potato starch and wheat starch and mixtures thereof.

4. A process according to claim 3 wherein said dough is sheeted in step (c) to a thickness of from about 0.2 to about 2 cm.

5. A process according to claim 4 wherein said laminated product is heterogeneous and has a thickness of from about 0.1 cm to about 0.25 cm and consists of at least 20 layers.

6. A process according to claim 5 wherein said second phase dough further contains flavors.

7. A process according to claim 5 wherein said salt is selected from the group consisting of sodium chloride, potassium chloride and mixtures thereof.

8. A process according to claim 7 wherein said shortening in the second phase dough comprises vegetable oil and less than 5% hardstock.

9. A process according to claim 8 wherein said oil is selected from the group consisting of soybean oil, canola oil, rapeseed oil, butter oil, safflower oil and sunflower seed oil.

10. A process according to claim 7 wherein said second phase contains from about 0.5% to about 2% sodium chloride.

11. A process according to claim 10 wherein said shortening in the first phase dough contains from about 10% to about 15% hardstock.

12. A process according to claim 11 wherein said said shortening is a vegetable shortening selected from the group consisting of hydrogenated and unhydrogenated soybean oil, canola oil, rapeseed oil, butter oil, safflower oil and sunflower seed oil.

13. A process according to claim 9 wherein said shortening is lard or tallow.

14. A process according to claim 12 wherein said flour is enriched wheat flour.

15. A pastry dough product comprising from about 20 to about 50 layers, said layers comprising two phases, a first phase comprising:
    (1) from about 20% to about 45% shortening;
    (2) from about 55% to about 80% ungelatinized starch;
    (3) from about 0.8% to about 5% polyol; and
    a second phase comprising:
    (1) from about 20% to about 80% flour having from about 3% to 14% protein;
    (2) from about 10% to about 30% water;
    (3) from about 10% to about 30% oil mixed with from about 1% to about 5% hardstock; and
    (4) from about 0.5% to about 2% salt
    wherein said product is from about 0.25 cm to about 0.5 cm thick and wherein said product has discrete regions of first phase product and discrete regions of second phase containing developed gluten.

16. A product according to claim 15 wherein said polyol is selected from the group consisting of propylene glycol, glycerine, sorbitol and mannitol and mixtures thereof.

17. A product according to claim 16 wherein said starch is selected from the group of corn starch, potato starch and wheat starch and mixtures thereof, and said flour is wheat flour.

18. A product according to claim 17 consisting of from about 20 to about 40 layers and wherein said layers are non-continuous.

19. A product according to claim 18 wherein said second phase dough further contains flavors.

20. A product according to claim 19 wherein said shortening in the second phase dough comprises a vegetable oil, and from about 2% to about 5% hardstock.

21. A product according to claim 20 wherein said oil is selected from the group consisting of soybean oil, canola oil, rapeseed oil, butter oil, safflower oil and sunflower seed oil.

22. A product according to claim 21 wherein said shortening in the first phase one contains from about 12% to about 15% hardstock.

23. A product according to claim 22 wherein said said shortening is a vegetable shortening selected from the group consisting of hydrogenated and unhydrogenated soybean oil, canola oil, rapeseed oil, butter oil, safflower oil and sunflower seed oil.

* * * * *

UNITED STATES PATENT AND TRADEMARK OFFICE
CERTIFICATE OF CORRECTION

PATENT NO. : 5,466,476
DATED : November 14, 1995
INVENTOR(S) : Finkel et al.

It is certified that error appears in the above-indentified patent and that said Letters Patent is hereby corrected as shown below:

Column 12, line 18 "A pastry dough product comprising from about 20 to about 50 layers," should read -- A pastry dough product having about 20% to about 30% fat comprising from about 20 to about 50 layers," --

Signed and Sealed this

Twenty-ninth Day of October 1996

Attest:

BRUCE LEHMAN

*Attesting Officer*   *Commissioner of Patents and Trademarks*